United States Patent
Asai (10) Patent No.: US 6,603,747 B2
(45) Date of Patent: *Aug. 5, 2003

(54) COMMUNICATION CONTROL METHOD AND COMMUNICATION CONTROL APPARATUS

(75) Inventor: Akio Asai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,204

(22) Filed: Nov. 13, 1998

(65) Prior Publication Data

US 2003/0058817 A1 Mar. 27, 2003

(30) Foreign Application Priority Data

Nov. 14, 1997 (JP) ............................................. 9-331218

(51) Int. Cl.[7] ................................................. H04J 3/16
(52) U.S. Cl. ......................... 370/322; 370/444; 370/447
(58) Field of Search ................................. 370/316, 319, 370/321, 322, 329, 442, 443, 444, 462, 336, 447

(56) References Cited

U.S. PATENT DOCUMENTS

| 5,436,888 A | * | 7/1995 | Ueda ............................ 370/351 |
| 5,515,379 A | | 5/1996 | Crisler et al. |
| 5,636,223 A | * | 6/1997 | Reardon et al. ............. 370/431 |
| 5,659,881 A | * | 8/1997 | Kent ............................ 455/520 |
| 5,752,193 A | * | 5/1998 | Scholefield et al. ......... 455/452 |
| 6,172,971 B1 | * | 1/2001 | Kim ............................ 370/348 |

FOREIGN PATENT DOCUMENTS

| EP | 0 681 406 A1 | 5/1995 |
| JP | 60-123950 | 7/1985 |
| JP | 61-156947 | 7/1986 |
| JP | 63-67926 | 3/1988 |
| JP | 1-165232 | 6/1989 |
| JP | 02-162937 | 6/1990 |
| JP | 3-73624 | 3/1991 |
| JP | 3-80716 | 4/1991 |
| JP | 06-46070 | 2/1994 |
| JP | 04-223736 | 2/1994 |
| JP | 7-71080 | 7/1995 |
| JP | 07-175817 | 7/1995 |
| JP | 8-322078 | 12/1996 |
| WO | WO 97/09836 A1 | 3/1997 |

* cited by examiner

Primary Examiner—Min Jung
(74) Attorney, Agent, or Firm—Sughrue Mion, PLLC (57) ABSTRACT

A priority corresponding to the emergency level of a communication in each slave station is allocated to a time slot assignment request transmitted from each slave station to master station. When master station receives the time slot assignment request to which the priority is set, the priority of the time slot assignment request is judges in slot assignment controller. When there is not any vacant time slot having the priority judged and at the same time there is a vacant time slot whose priority is lower than the priority concerned, the time slot whose priority is lower than the priority concerned is allocated to the time slot assignment request, whereby the assignment waiting time until data having a high emergency level are transmitted can be shortened.

10 Claims, 5 Drawing Sheets

| PRIORITY 1 | PRIORITY 0 | PRIORITY 0 | PRIORITY 0 | PRIORITY 0 | PRIORITY 0 |
|---|---|---|---|---|---|
| A | B | C | D | E | F |

FIG. 5B

| PRIORITY 1 | PRIORITY 1 | PRIORITY 0 | PRIORITY 0 | PRIORITY 0 | PRIORITY 0 |
|---|---|---|---|---|---|
| A | B | C | D | E | F |

FIG. 5C

| PRIORITY 1 | PRIORITY 1 | PRIORITY 1 | PRIORITY 0 | PRIORITY 0 | PRIORITY 0 |
|---|---|---|---|---|---|
| A | B | C | D | E | F |

COMMUNICATION CONTROL METHOD AND COMMUNICATION CONTROL APPARATUS

BACKGROUND OF THE INVENTION

1. Field of the Invention

The present invention relates to a communication control method and a communication control apparatus therefor in which a master station and slave stations are connected to one another through a communication channel having a star configuration so that each slave station accesses the master station through the communication channel of TDMA (Time Division Multiple Access) system, and the master station can transmit data to all the slave stations through the communication channel in a broadcast mode.

2. Description of the Prior Art

FDMA (Frequency Division Multiple Access) system and TDMA system are respectively known as a communication control system for assigning one channel to plural stations. Among the TDMA system which has been used as a conventional communication control system for time-dividing one channel of a satellite in a satellite communication, an assignment of time slots to each station is performed according to, for example, a fixed assignment method by which time slots are assigned in a fixed manner (Per Assignment) or a connection request assigning method by which time slots are assigned in the arrival order of a time slot assignment request (Demand Assignment).

In the conventional communication system, the assignments of the time slots to the stations are performed as explained above. Therefore, even when the emergency level of data to be transmitted is higher, the time-slot assignment is performed in the same manner as data whose emergency level is lower. Accordingly, even data having a high emergency level cannot be transmitted immediately, or rather, until its transmission turn comes. Therefore, a standby time needed until the data having the high emergency level are transmitted becomes longer, and a delay time for the data transmission becomes also longer.

SUMMARY OF THE INVENTION

An object of the present invention is to provide a communication control method and a communication control system apparatus therefor which can reduce a time-slot assignment waiting time of a time-slot assignment request when a highly-emergent communication is made, and can flexibly vary the occupation rate of time slots having high emergency level in accordance with the condition of the time-slot assignment request to enhance the usage efficiency of the time slots.

According to a first aspect of the present invention, there is provided a communication control method in which plural slave stations transmit data to a master station through a transmission channel of a time division multiple access system, the master station transmits data to the slave stations in a broadcast mode, the master station assigns a time slot to a time slot assignment request transmitted from each of the slave stations to the master station, and each of the slave stations performs the communication by using the time slot assigned thereto, which method comprises: an initial priority assigning step for beforehand assigning initial priorities to time slots, the initial priority assigning step being executed by the master station; a priority assigning step for assigning a priority to a time slot assignment request to be transmitted from each of the slave stations to the master station in accordance with the emergency level of a communication, the priority assigning step being executed by each of the slave stations; a priority judging step for judging the priority assigned to the time slot assignment request when the master station receives the time slot assignment request to which the priority is assigned in the priority assigning step, the priority judging step being executed by the master station; and a time slot assigning step for assigning a time slot having the same priority as the judged priority to the time slot assignment request when the time slot having the same priority is not occupied, whereas assigning a time slot having a priority which is lower than the judged priority to the time slot assignment request when the time slot having the same priority is occupied, but at the same time the time slot having the priority which is lower than the judged priority is not occupied, the time slot assigning step being executed by the master station.

According to the communication control method of the present invention, the time slot having the priority which is lower than the priority which is set in the time slot assigning request is allocated to the time slot assigning request so as to increase the capacity of a communication whose emergency level is high, and shorten the time slot assignment waiting time of the time slot assignment request having a high emergency level.

According to a second aspect of the present invention, there is provided a communication control apparatus in which plural slave stations transmit data to a master station through a transmission channel of a time division multiple access system, the master station transmits data to the slave stations in a broadcast mode, the master station assigns a time slot to a time slot assignment request transmitted from each of the slave stations to the master station, and each of the slave stations performs the communication by using the time slot assigned thereto, wherein the master station comprises: a judgment unit for judging a priority extracted from a time slot assignment request whose priority is set in accordance with an emergency level of a communication and which is transmitted from each of the slave stations; and a slot assignment controller for assigning an initial priority to the time slot beforehand, and assigning a time slot having the same priority as the judged priority to the time slot assignment request when there is a time slot having the same priority as the judged priority, whereas assigning a time slot having priority which is lower than the judged priority to the time slot assignment request when there is not any time slot having the judged priority and at the same time there is a time slot having priority which is lower than the judged priority.

According to the communication control system apparatus of the present invention, when any time slot whose priority is the same as the priority which is set in the time slot assignment request is not vacant, but at the same time a time slot whose priority is lower than the priority concerned is vacant, the time slot whose priority is lower than the priority concerned is assigned to the time slot assignment request, thereby shortening the time slot assignment waiting time of the time slot assignment request which is high in emergency level, that is, in priority, and also enhancing the usage efficiency of the time slot.

DETAILED DESCRIPTION OF THE PREFERRED EMBODIMENTS

A preferred embodiment according to the present invention will be explained hereunder with reference to the accompanying drawings.

A communication control method and a communication control apparatus according to a mode of embodiment of the present invention will be explained.

The following explanation will be made on the communication control method and the communication control system apparatus for a satellite communication by using a satellite. However, the communication to which the communication control method and the communication control system apparatus of the present invention are applied is not limited to the satellite communication using a satellite, and it may be a communication using a communication channel on the ground.

Figure 1:
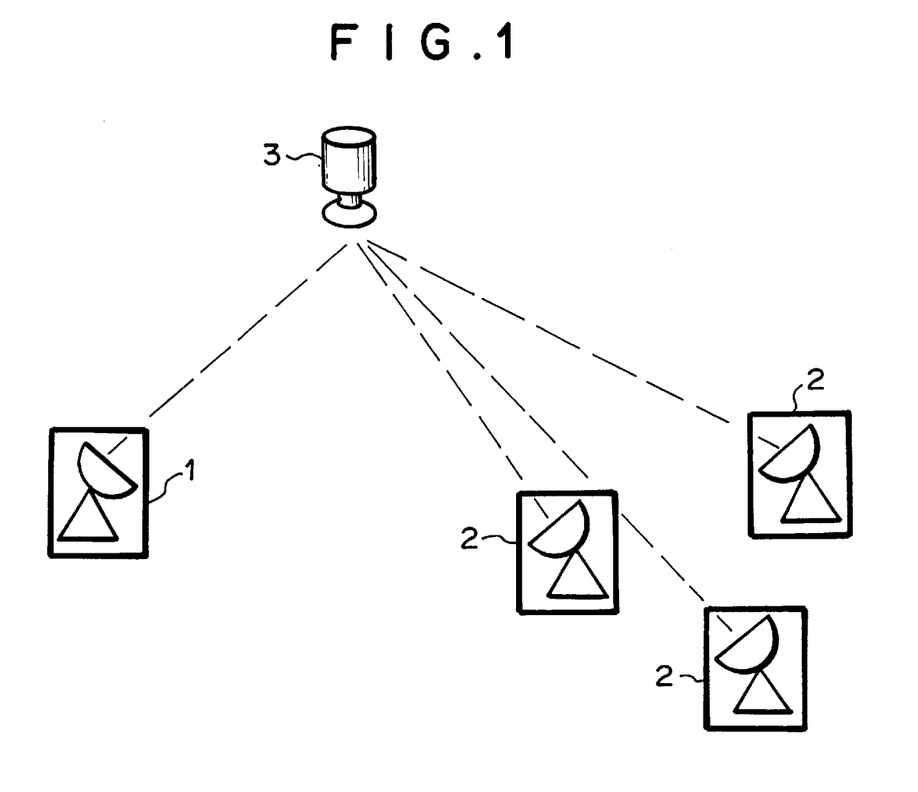
FIG. 1 is a diagram showing the construction of a satellite communication system to which a communication control method of embodiment of the present invention is applied.

FIG. 1 is a diagram showing an example of a satellite communication system to which the communication control method of this embodiment is applied. In FIG. 1, reference numeral 1 represents a basis station (hereinafter referred to as "master station"), reference numeral 2 represents a subordinate station (hereinafter referred to as "slave station"), and reference numeral 3 represents a communication satellite.

In the satellite communication system, master station 1 is connected to plural slave stations 2 through a satellite channel having a star configuration, and each slave station 2 is allowed to access master station 1 through communication satellite 3 according to TDMA system. Master station 1 can perform transmission to all the slave stations 2 through communication satellite 3 in a broadcast mode.

Figure 2:
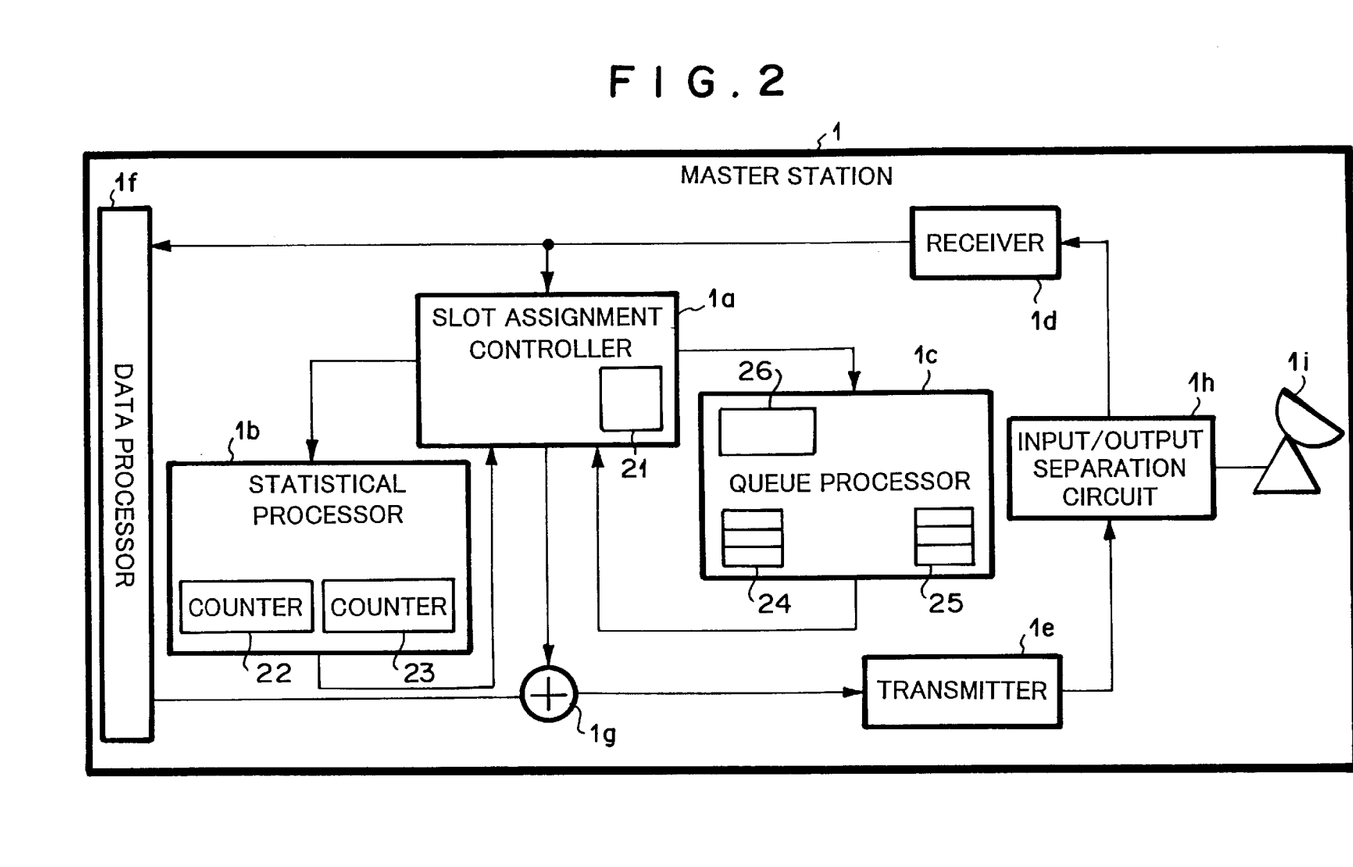
FIG. 2 is a block diagram showing the construction of a master station in a communication control system apparatus to which the communication control method of embodiment of the present invention is applied.
Figure 3:
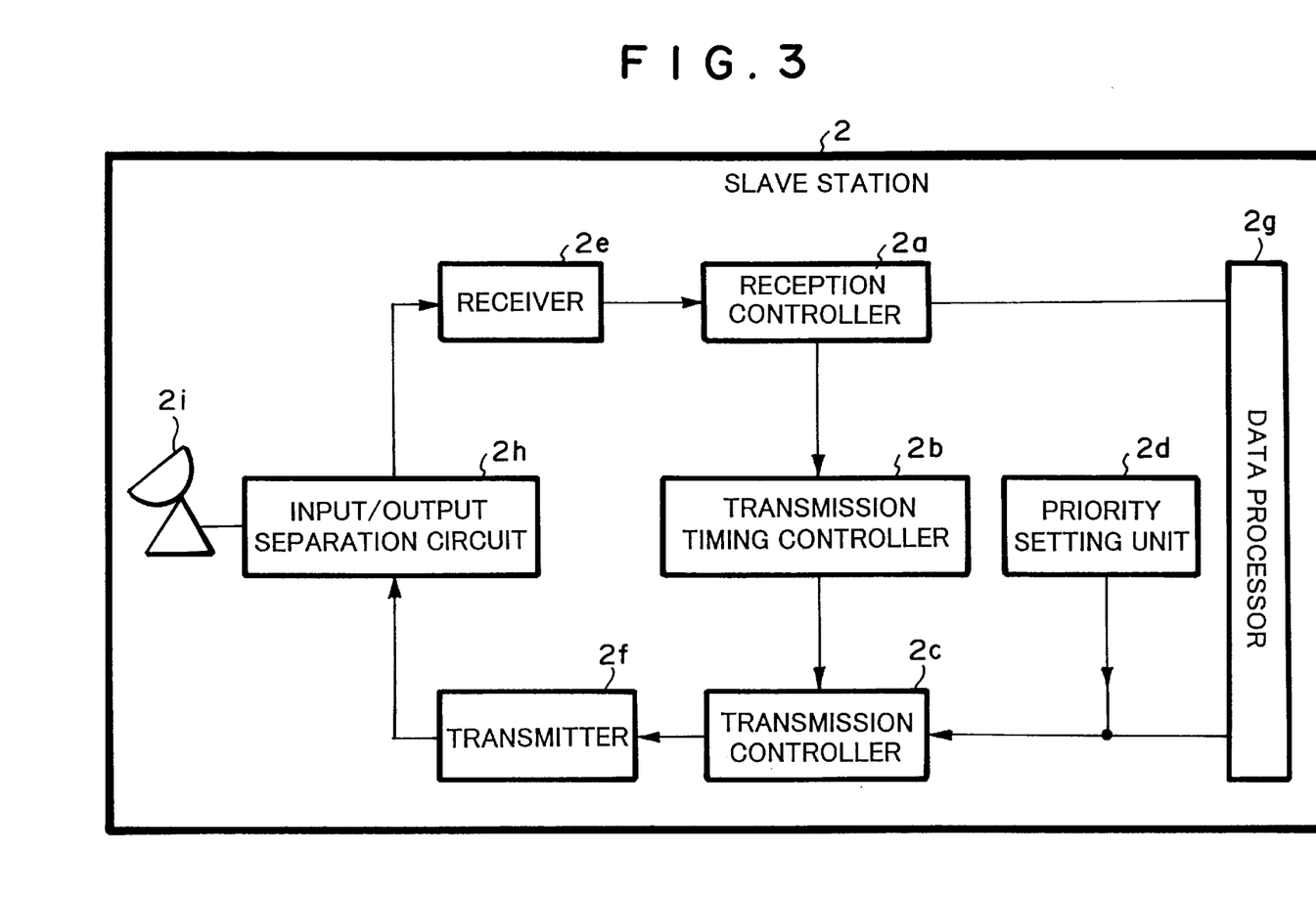
FIG. 3 is a block diagram showing the construction of a slave station in the communication control system apparatus to which the communication control method of embodiment of the present invention is applied.

FIGS. 2 and 3 show the communication control system apparatus to which the communication control method of this embodiment is applied, wherein FIG. 2 is a block diagram showing the construction of master station 1, and FIG. 3 is a block diagram showing the construction of slave station 2.

In FIG. 2, master station 1 has slot assignment controller 1a, statistical processor 1b, a queue processor 1c, receiver 1d, transmitter 1e, data processor 1f, adder 1g and input/output separation circuit 1h.

Slot assignment controller 1a assigns priorities to time slots, receives a priority which is set, in accordance with the emergency level, in a time slot assignment request transmitted from a slave station, and assigns a time slot to the time slot assignment request. In this case, it is assumed that the priorities are classified into a high priority type, i.e. priority of "1", for which emergency is needed, and a low priority type, i.e. priority of "0" for which emergency is not needed. In connection with this classification, judgment unit 21 of slot assignment controller 1a judges whether a priority set in a time slot assignment request received from slave station 2 is "1" or "0".

Statistical processor 1f counts a slot assignment request frequency every priority to get statistic on the priorities. Statistical processor 1f includes counter 22 for priority "1" whose count value is incremented by "1" when a priority of a time slot assignment request received from slave station 2 is "1", and counter 23 for priority "0" whose count value is incremented by "1" when a priority of a time slot assignment request received from a slave station 2 is "0".

Queue processor 1c accumulates queues of time slot assignment requests waiting for assignment, and queue processor 1c includes queue 24 for time slot assignment requests of priority "1", queue 25 for time slot assignment requests of priority "0", and rate change requesting unit 26 for requesting slot assignment controller 1a to increase the rate of time slots of the priority of which the length of queue 24 or 25 exceeds a predetermined value.

Receiver 1d receives data transmitted from slave station 2. Transmitter 1e transmits data to slave station 2. Data processor 1f processes the reception data transmitted from slave station 2, and generates data to be transmitted to slave station 2. Adder 1g adds a time slot and time slot assignment information to the transmission data to be transmitted from master station 1 to each slave station 2. The time slot assignment information includes a priority of the time slot and an identifier of slave station 2. Input/output separation circuit 1h outputs the transmission data received from transmitter 1e to be transmitted to each slave station 2 to antenna portion 1i of master station 1, and inputs the reception data transmitted from each slave station 2 through antenna portion 1i of master station 1 to transfer the reception data to receiver 1d. Input/output separation circuit 1h performs separation processing on the transmission data and the reception data on the basis of the frequencies assigned to the transmission data and the reception data, respectively, and inputs/outputs the reception/transmission data.

In FIG. 3, slave station 2 includes reception controller 2a, transmission timing controller 2b, transmission controller 2c, priority setting unit 2d, receiver 2e, transmitter 2f, data processor 2g and input/output separation circuit 2b.

Reception controller 2a transmits a synchronization signal of the received time slot and the received time slot assignment information to transmission timing controller 2b. Transmission timing controller 2b controls the transmission timing on the basis of the synchronization signal and time slot assignment information. Transmission controller 2c controls the data transmission so that the transmission data are transmitted at the transmission timing controlled by the transmission timing controller 2b.

Further, priority setting unit 2d sets the priority in accordance with the emergency level of the communication when priority setting unit 2d requests time slot assignment to the master station 1. Receiver 2e receives reception data from master station 1. Transmitter 2f transmits transmission data. Data processor 2g processes the reception data transmitted from master station 1, and generates the transmission data to be transmitted to the master station 1. Input/output separation circuit 2h outputs the transmission data from transmitter 2f to be transmitted to master station 1 to slave station antenna portion 2i, and inputs the reception data transmitted from master station 1 from slave station antenna portion 2i to transfer the reception data to receiver 2e. Further, input/ output separation circuit 2h performs separation processing on the transmission data and the reception data on the basis of the frequencies assigned to the transmission data and the reception data, respectively, and inputs/outputs the reception/transmission data.

Next, the operation of this embodiment will be explained.

Figure 4:
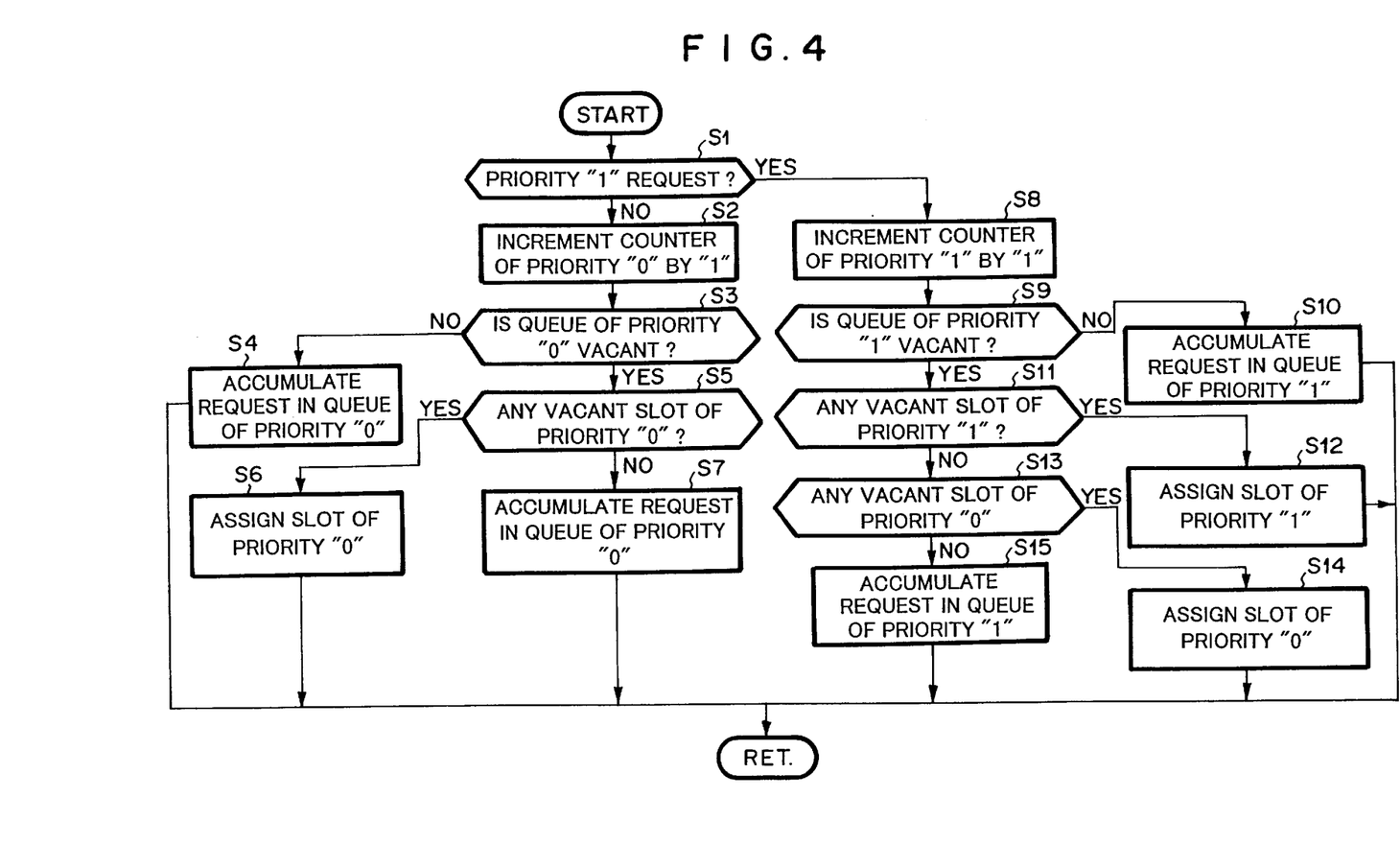
FIG. 4 is a flowchart showing the steps of the communication control method of embodiment of the present invention.

FIG. 4 is a flowchart showing the steps of the communication control method of this embodiment. This flowchart shows the operation of slot assignment controller 1a when the time slot assignment request is transmitted from the slave station 2.

First, judgment unit 21 judges whether the priority set in a time slot assignment request from slave station 2 is "1" or "0" (step S1). If the priority is judged to be "1", the count value of counter 22 for priority "1" of statistical processor 1b is incremented by "1" (step S8), while if the priority is judged to be "0", the count value of counter 23 for priority "0" is incremented by "1" (step S2).

In the case where the priority set in the time slot assignment request from slave station 2 is judged to be "0", it is checked whether queue 25 for priority "0" is vacant (step S3). If there is any time slot assignment request queue waiting for assignment in queue 25, the received time slot assignment request is added to queue 25 for priority "0" of the queue processor 1c (step S4).

On the other hand, if queue 25 for priority "0" is vacant, it is checked whether there is any vacant time slot of priority "0" (step S5). If there is any vacant time slot of priority "0", a time slot of priority "0" is assigned to the received time slot assignment request. Further, if there is not any vacant time slot of priority "0", the received time slot assignment request is added to queue 25 for priority "1" of queue processor 1c (step S7).

Next, a case where the priority "1" is set in the received time slot assignment request will be explained.

After the processing of step S8, it is checked whether queue 24 for priority "1" is vacant (step S9). If there is any time slot assignment request waiting for assignment in queue 24, the received time slot assignment request is added to queue 24 for priority "1" of the queue processor 1c (step S10).

On the other hand, if queue 24 for priority "1" is vacant, it is checked whether there is any vacant time slot of priority "1" (step S11). If there is any vacant time slot of priority "1", a time slot of priority "1" is assigned to the received time slot assignment request (step S12). If there is not any vacant time slot of priority "1", it is checked whether there is any vacant time slot of priority "0" (step S13). If there is any vacant time slot of priority "0", a time slot of priority "0" is assigned to the received time slot assignment request (step S14). If there is not any vacant time slot of priority "0", the received time slot assignment request is added to queue 24 for priority "1" of queue processor 1c (step S15).

Time slot assignment controller 1a of master station 1 of FIG. 2 checks whether there is any time slot assignment request in queue 24 for priority "1" and whether there is any time slot assignment request in queue 25 for priority "0" when there is any vacant time slot, and assigns a vacant time slot to a time slot assignment request in queue 24 or 25 in the order of priority.

Further, statistical processor 1b notifies slot assignment controller 1a of the ratio of the frequency of the time slot assignment requests of the priority "1" to that of the priority "0" every fixed time, and slot assignment controller 1a changes the rate of the respective priorities of the time slots on the basis of the notification.

Figure 5A:
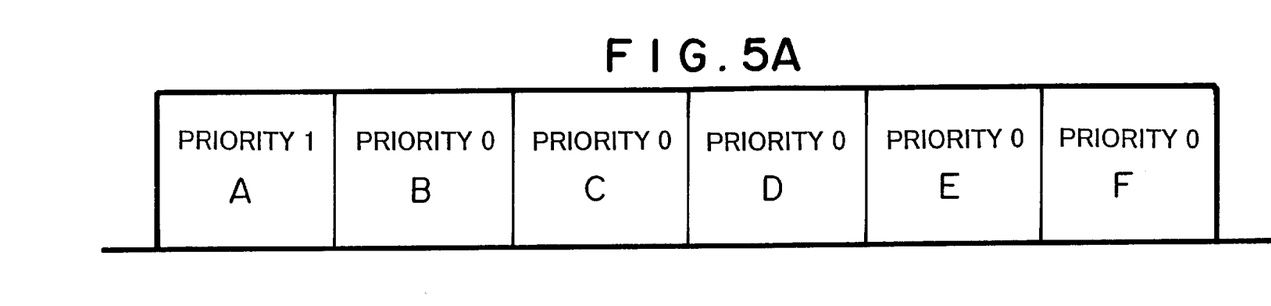
FIGS. 5A to 5C are explanatory diagrams of a case where the rates of respective priorities assigned to time slots are varied based on the communication control method of embodiment of the present invention.
Figure 5B:
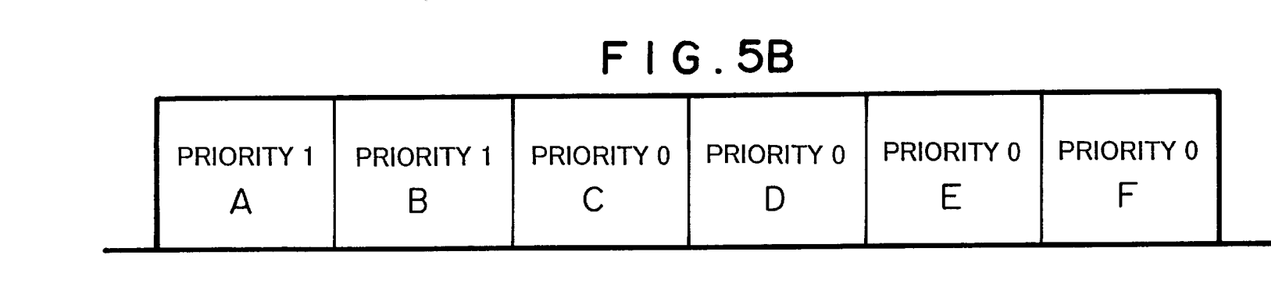
Figure 5C:
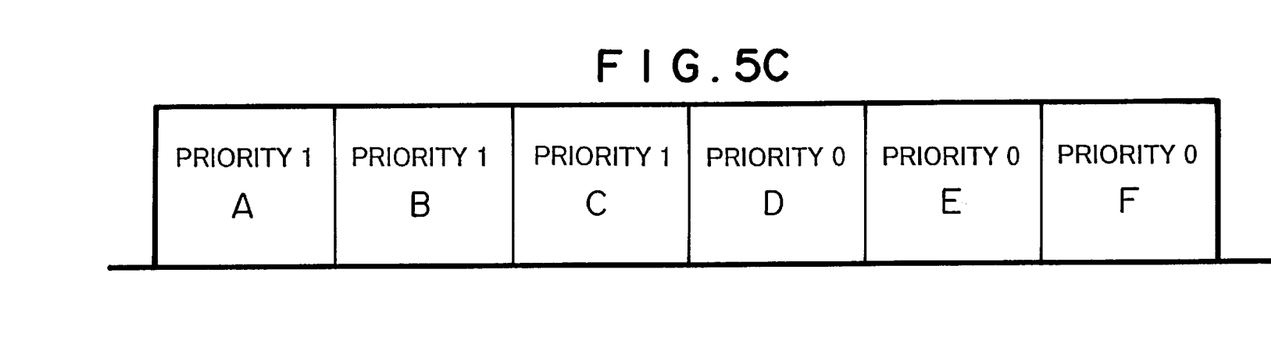

FIG. 5 is an explanatory diagram showing the case where the rates of respective priorities assigned to time slots are varied, and in this diagram, a frame having six time slots of A to F is considered.

It is assumed that a frame has six time slots of A to F. Even when the frame has initially a priority ratio shown in FIG. 5(a), the ratio of the time slots of the priority "1" to that of the priority "0" is changed to 1:2 as shown in FIG. 5(b) if the ratio of the number of time slot assignment requests of the priority "1" to that of the priority "0" is 1:2. Further, the ratio of the number of time slots of the priority "1" to that of the priority "0" is changed to 1:1 as shown in FIG. 5(c) if the ratio of the number of time slot assignment requests of the priority "1" to that of the priority "0" is 1:1.

When the number of time slot assignment requests in queue 24 or 25 exceeds a certain number, rate change requesting unit 26 request slot assignment controller 1a to increase the rate of the time slots of the corresponding priority, so that slot assignment controller 1a changes the rate of each priority of the time slots on the basis of the request. In this case, the certain number of time slot assignment requests in each queue 24 or 25 at which the request of the increase is triggered may be arbitrarily set as a parameter.

Provided that a frame has six time slots of A to F and the frame has a priority rate as shown in FIG. 5(c) initially, if the number of time slot assignment requests in queue 25 exceeds the certain number, the number of time slots of priority "0" is increased and the rate is changed as shown in FIG. 5(b). The assignment of the respective priorities to the time slots is made so that every priority is always assigned to at least one time slot.

In slave station 2, the time slot assignment information transmitted from master station 1 is received by receiver 2e shown in FIG. 3, separated in reception controller 2a, and then transmitted to transmission timing controller 2b. On the basis of the time slot assignment information, transmission timing controller 2b transmits the transmission timing of the transmission data to transmission controller 2c. Transmission controller 2c transmits the transmission data to transmitter 2f in conformity with the time slot which is assigned at the transmission timing transmitted from transmission timing controller 2b on the basis of the time slot assignment information.

Further, in case where the time slot assignment request is transmitted from slave station 2 to master station 1, the priority "1" or the priority "0" which is determined in accordance with the emergency level of the communication is set in the time slot assignment request in priority setting unit 2d, and then the time slot assignment request is transmitted to master station 1.

As explained above, according to the present invention, the priority corresponding to the emergency level is set in the time slot assignment request transmitted from slave station 2 to master station 1, and in accordance with the priority thus set, a time slot is assigned to a communication having a high emergency level prior to a communication having a low emergency level. Therefore, there can be provided the communication control method and the communication control system apparatus which can shorten the waiting time until data having a high emergency level are transmitted.

Further, statistical processor 1b notifies the ratio of the frequencies of the time slot assignment request of priority "1" to that of the priority "0" to slot assignment controller 1a every fixed time, and slot assignment controller 1a changes the rate of each priority assigned to the time slots on the basis of the notification. Therefore, there can be provided the communication control method and the apparatus therefor which can flexibly change the rate of the time slots of the priority "1" with high responsibility to an occurrence of a time slot assignment request for a communication having a high emergency level in a slave station, and shorten the waiting time until data having a high emergency level are transmitted.

Further, if the rate of the frequency of the time slot assignment request of priority "0" is increased, the rate of the priority "0" assigned to the time slots is increased. Therefore, there can be provided the communication method and the communication control system apparatus therefor which can change the rate of the time slots with high responsibility to an occurrence of a time slot assignment request for a communication having a non-emergency level in a slave station, and assign the time slot to the time slot assignment request so as to suppress the increase of the frequency of the time slot assignment request waiting for assignment, whereby the usage efficiency of the time slots is enhanced.

Still further, when the number of time slot assignment requests waiting for assignment in queue 24 of the priority "1" or queue 25 of the priority "0" exceeds a predetermined number, rate change requesting unit 26 of queue processor 1c requests slot assignment controller 1a to increase the rate of the time slots of the corresponding priority, and slot assignment controller 1a changes the rate of each priority assigned to the time slots on the basis of the notification. Further, the number of slot assignment requests waiting request accumulated in queue 24 of the priority "1" and the number of slot assignment requests waiting request accumulated in queue 25 of the priority "0" at which the change of the rate of the time slots is triggered are arbitrary set as parameters. Therefore, a more flexible countermeasure can be taken in accordance with the occurrence condition of the time slot assignment request, so that the number of time slot assignment requests waiting for assignment can be suppressed and the usage efficiency of the time slots can be enhanced.

In the above-explained embodiments, the priorities are classified into two levels (priority "1" and priority "0"). However, the priorities may be further classified into more levels.

Further, in the above-explained embodiments, statistical processor 1b notifies the ratio of the frequency of the time slot assignment requests of the priority "1" to that of the priority "0" to slot assignment controller 1a every constant time. However, the notification may be made not every constant time, but when the total number of time slot assignment requests exceeds a predetermined number or when the difference between the current assignment ratio of the time slots and the ratio of the actual time slot assignment requests becomes more than a predetermined value.

As explained above, according to the communication control method of the present invention, in each slave station, the priority corresponding to the emergency level of the communication is assigned to the time slot assignment request transmitted from the slave station to the master station. When the master station receives the time slot assignment request to which the priority is assigned, it judges the priority of the time slot assignment request, and when there is no vacant time slot having the priority thus judged, and there is a vacant time slot whose priority is lower than the priority concerned, the time slot whose priority is lower than the priority concerned is assigned to the time slot assignment request. Therefore, the time slot assignment waiting time can be shortened on the basis of the priority information set in the time slot assignment request when the communication having a high emergency level is performed.

Further, according to the communication control method of the present invention, the time slot assignment request frequency within a predetermined time is accumulated every priority set in the time slot assignment request transmitted from each slave station to the master station, and the rate of the number of time slots of each priority is changed on the basis of the accumulated time slot assignment request frequency every the priority. Therefore, in accordance with the condition of the time slot assignment request transmitted from each slave station to the master station, the rate of the time slots to be assigned to the time slot assignment request every priority can be flexibly changed, and the usage efficiency of the time slots can be enhanced.

Still further, according to the communication control method of the present invention, the number of time slot assignment requests is accumulated every priority which is set in the time slot assignment request transmitted from each slave station to the master station, and when the total of the numbers exceeds a predetermined value, the rate of the time slot amount every priority is changed on the basis of the accumulated number of time slot assignment requests every priority. Therefore, in accordance with the condition of the time slot assignment request transmitted from each slave station to the master station, the rate of the time slots to be assigned to the time slot assignment requests of the priority for which the accumulated number exceeds a corresponding reference value can be flexibly changed on the basis of the time slot assignment requests and the corresponding reference value, whereby the usage efficiency of the time slots can be enhanced.

According to the communication control method of the present invention, the number of time slot assignment requests is accumulated every priority which is set in the time slot assignment request transmitted from each slave station to the master station, and when the difference between the ratio of the number of time slot assignment requests accumulated for every priority and the ratio of the time slot amount assigned to every priority exceeds a predetermined value, the ratio of the time slot amount assigned to every priority is changed. Therefore, in accordance with the condition of the time slot assignment request transmitted from each slave station to the master station, the rate of the time slots every priority can be flexibly changed on the basis of the difference between the ratio of the number of time slot assignment requests accumulated for every priority and the ratio of the time slot amount assigned to every priority, whereby the usage efficiency of the time slots can be enhanced.

According to the communication control method of the present invention, the assignment-waiting time slot assignment request is accumulated every priority, and when the number of accumulated time slot assignment requests exceeds a predetermined number, the rate of the time slots whose priority is the same as the priority of the assignment-waiting time slot assignment requests whose number exceeds the predetermined number is increased. Further, when the time slot assignment request whose priority is the same as the priority set in the present time slot assignment request is not accumulated in the corresponding queue and there is no vacant time slot whose priority is the same as the priority concerned while there is a vacant time slot whose priority is lower than the priority concerned, the time slot whose priority is lower than the priority concerned is assigned to the present time slot assignment request. Therefore, the time slot assignment waiting time of the time slot assignment request having the high priority can be shortened as a result, and the time slot usage efficiency related to the high-priority time slot assignment request can be enhanced.

Further, according to the communication control system apparatus of the present invention, the master station includes: the judgment unit for extracting a priority from a time slot assignment request whose priority is assigned in accordance with the emergency level of a communication and which is transmitted from each slave station, and judging the priority; and the slot assignment controller for beforehand assigning an initial priority to a time slot assigned to each slave station, and on the basis of the priority judged in the judgment unit, assigning to the time slot assignment request a time slot whose priority is lower than the priority judged in the judgment unit when the time slot of the priority concerned is occupied, but at the same time the time slot having the priority which is lower than the priority concerned is vacant. Therefore, the time slot assignment waiting time can be shortened for the time slot assignment request having a high priority, and the time slot usage efficiency can be enhanced for the time slot assignment request having a high priority.

Further, the communication control system apparatus of the present invention is provided with the slot assignment controller for changing the rate of the time slot amount every priority on the basis of the time slot assignment request frequency which is accumulated in the statistical processor every priority which is set in the time slot assignment request transmitted from each slave station to the master station. Therefore, the time slot assignment waiting time can be shortened for not only the time slot assignment request having the high priority, but also the time slot assignment request having the low priority, and also the usage efficiency of the time slots can be enhanced therefore.

Still further, according to the communication control system apparatus, according to the communication control system apparatus of the present invention, when the number of time slot assignment requests accumulated in the queue processor for a certain priority exceeds a predetermined number, the rate of the time slots having the concerned priority is increased. Further, when the time slot assignment request having the same priority as the priority judged in the judgment unit for a current time slot assignment request is not accumulated in the queue processor, and at the same time there is no vacant time slot having the same priority while there is a vacant time slot having the priority which is lower than the priority concerned, the time slot whose priority is lower than the priority concerned is assigned to the current time slot assignment request. Therefore, the time slot assignment waiting time can be shortened for the time slot assignment request having the high priority, and further the time slot usage efficiency for the time slot assignment requests having the high priority can be enhanced.

What is claimed is:

1. A communication control method in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, the method comprising:

an initial priority level assigning step for securing time slots for each priority level, said initial priority level assigning step being executed by said master station;

a priority level assigning step for assigning, in accordance with the emergency level of a communication, a priority level to a time slot assignment request to be transmitted from each of said slave stations to said master station, said priority level assigning step being executed by each of said slave stations;

a priority level judging step for judging the priority level assigned to the time slot assignment request when said master station receives the time slot assignment request to which the priority level is assigned in said priority level assigning steps, said priority level judging step being executed by said master station;

a time slot assigning step for assigning to the time slot assignment request a time slot having the same priority level as the time slot assignment request when there is at least one time slot having the same priority level as the time slot assignment request, and alternatively assigning to the time slot assignment request a time slot having a priority level which is lower than the priority level of the time slot assignment request when there is no time slot having the same priority level as the time slot assignment request, and there is at least one time slot having a priority level which is lower than the priority level of the time slot assignment request, said time slot assigning step being executed by said master station;

an assignment request accumulating step for accumulating time slot assignment request in a queue if there is at least one time slot assignment request accumulated in a queue for every priority level, said assignment request accumulating step being executed by said master station; and a time slot number changing step for increasing the number of time slots having a given priority level when the number of accumulated time slot assignment requests of that priority level exceeds a predetermined number, while decreasing the number of time slots having the other priorities in compensation for the increase, said time slot number increasing step being executed by said master station, wherein said time slot assignment step is executed for a new time slot assignment request if there is no past time slot assignment request which has been accumulated in a queue for every priority level, and wherein accumulation of a time slot assignment request in the queue is executed if the time slot having the same priority level as the time slot assignment request is occupied and the time slot having a priority level which is lower than the priority level of the time slot assignment request is also occupied in said time slot assignment step.

2. A communication control method in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, the method comprising:

an initial priority level assigning step for securing time slots for each priority level, said initial priority level assigning step being executed by said master station;

a priority level assigning step for assigning, in accordance with the emergency level of a communication, a priority level to a time slot assignment request to be transmitted from each of said slave stations to said master station, said priority level assigning step being executed by each of said slave stations;

a priority level judging step for judging the priority level assigned to the time slot assignment request when said master station receives the time slot assignment request to which the priority level is assigned in said priority level assigning step, said priority level judging step being executed by said master station;

a time slot assigning step for assigning to the time slot assignment request a time slot having the same priority level as the time slot assignment request when there is at least one time slot having the same priority level as the time slot assignment request, and alternatively assigning to the time slot assignment request a time slot having a priority level which is lower than the priority level of the time slot assignment request when there is no time slot having the same priority level as the time slot assignment request, and there is at least one time slot having a priority level which is lower than the priority level of the time slot assignment request, said time slot assigning step being executed by said master station;

an assignment request frequency counting step for counting the number of time slot assignment requests within a predetermined time for every priority level, said assignment request frequency counting step being executed by said master station; and a time slot number changing step for changing the number of time slots for every priority level on the basis of the number of time slot assignment requests within the predetermined time for every priority level wherein the number of time slots for a priority level is increased while the number of time slots for another priority level is decreased in compensation for the increase, said time slot number changing step being executed by said master station.

3. The communication control method as set forth in claim 2, which further comprises: an assignment request accumulating step for accumulating a time slot assignment request in a queue if there is at least a time slot assignment request accumulated in a queue for every priority level, said assignment request accumulating step being executed by said master station; and a time slot number changing step for increasing the number of time slots having a priority level of which the number of accumulated time slot assignment requests exceeds a predetermined number, while decreasing the number of time slots having the other priorities in compensation for the increase, said time slot number increasing step being executed by said master station, wherein said time slot assignment step is executed for a new time slot assignment request if there is no past time slot assignment request which has been accumulated in a queue for every priority level, and wherein accumulation of a time slot assignment request in the queue is executed if the time slot having the same priority level as the time slot assignment request is occupied and the time slot having a priority level which is lower than the priority level of the time slot assignment request is also occupied in said time slot assignment step.

4. A communication control method in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, the method comprising:

an initial priority level assigning step for securing time slots for each priority level, said initial priority level assigning step being executed by said master station;

a priority level assigning step for assigning, in accordance with the emergency level of a communication, a priority level to a time slot assignment request to be transmitted from each of said slave stations to said master station, said priority level assigning step being executed by each of said slave stations;

a priority level judging step for judging the priority level assigned to the time slot assignment request when said master station receives the time slot assignment request to which the priority level is assigned in said priority level assigning step, said priority level judging step being executed by said master station;

a time slot assigning step for assigning to the time slot assignment request a time slot having the same priority level as the time slot assignment request when there is at least one time slot having the same priority level as the time slot assignment request, and alternatively assigning to the time slot assignment request a time slot having a priority level which is lower than the priority level of the time slot assignment request when there is no time slot having the same priority level as the time slot assignment request, and there is at least one time slot having a priority level which is lower than the priority level of the time slot assignment request, said time slot assigning step being executed by said master station;

an assignment request number counting step for counting the number of time slot assignment requests for every priority level until the total of the numbers reaches a predetermined value, said assignment request number counting step being executed by said master station; and a time slot number changing step for changing time slots for every priority level when any of the numbers exceeds a corresponding reference value, wherein the number of time slots for a priority level is increased while the number of time slots for another priority level is decreased in compensation for the increase, said time slot number changing step being executed by said master station.

5. The communication control method as set forth in claim 4, which further comprises:

an assignment request accumulating step for accumulating a time slot assignment request in a queue if there is at least a time slot assignment request accumulated in a queue for every priority level, said assignment request accumulating step being executed by said master station; and a time slot number changing step for increasing the number of time slots having a priority level of which the number of accumulated time slot assignment requests exceeds a predetermined number, while decreasing the number of time slots having the other priorities in compensation for the increase, said time slot number increasing step being executed by said master station, wherein said time slot assignment step is executed for a new time slot assignment request if there is no past time slot assignment request which has been accumulated in a queue for every priority level, and wherein accumulation of a time slot assignment request in the queue is executed if the time slot having the same priority level as the time slot assignment request is occupied and the time slot having a priority level which is lower than the priority level of the time slot assignment request is also occupied in said time slot assignment step.

6. A communication control method in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, the method comprising:

an initial priority level assigning step for securing time slots for each priority level, said initial priority level assigning step being executed by said master station;

a priority level assigning step for assigning, in accordance with the emergency level of a communication, a priority level to a time slot assignment request to be transmitted from each of said slave stations to said master station, said priority level assigning step being executed by each of said slave stations;

a priority level judging step for judging the priority level assigned to the time slot assignment request when said master station receives the time slot assignment request to which the priority level is assigned in said priority level assigning step, said priority level judging step being executed by said master station;

a time slot assigning step for assigning to the time slot assignment request a time slot having the same priority level as the time slot assignment request when there is at least one time slot having the same priority level as the time slot assignment request, and alternatively assigning to the time slot assignment request a time slot having a priority level which is lower than the priority level of the time slot assignment request when there is no time slot having the same priority level as the time slot assignment request, and there is at least one time slot having a priority level which is lower than the priority level of the time slot assignment request, said time slot assigning step being executed by said master station; an assignment request number counting step for counting the number of time slot assignment requests for every priority level until the total of the numbers reaches a predetermined value, said assignment request number counting step being executed by said master station; and a time slot ratio changing step for changing the ratio of the number of time slots of each priority level when the difference between the ratio of the number of time slot assignment requests of each priority level and the ratio of the number of time slots of each priority level exceeds a predetermined value, wherein the number of time slots for a priority level is increased while a number of the number of time slots for another priority level is decreased in compensation for the increase, said time slot ratio changing step being executed by said master station.

7. The communication control method as set forth in claim 6, which further comprises:

an assignment request accumulating step for accumulating a time slot assignment request in a queue if there is at least a time slot assignment request accumulated in a queue for every priority level, said assignment request accumulating step being executed by said master station; and a time slot number changing step for increasing the number of time slots having a priority level of which the number of accumulated time slot assignment requests exceeds a predetermined number, while decreasing the number of time slots having the other priorities in compensation for the increase, said time slot number increasing step being executed by said master station, wherein said time slot assignment step is executed for a new time slots assignment request if there is no past time slot assignment request which has been accumulated in a queue for every priority level, and wherein accumulation of a time slot assignment request in the queue is executed if the time slot having the same priority level as the time slot assignment request is occupied and the time slot having a priority level which is lower than the priority level of the time slot assignment request is also occupied in said time slot assignment step.

8. A communication control apparatus in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, wherein said master station comprises:

a judgment unit for judging a priority level extracted from a time slot assignment request whose priority level is set in accordance with an emergency level of a communication and which is transmitted from each of said slave stations;

a slot assignment controller for securing time slots for each priority level, and assigning to the time slot assignment request a time slot having the same priority level as the priority level of the time slot assignment request when there is at least a time slot having the same priority level as the priority level of the time slot assignment request, and alternatively assigning to the time slot assignment request a time slot having a priority level which is lower than the priority level of the time slot assignment request when there is not any time slot having the same priority level as the priority level of the time slot assignment request and there is at least a time slot having a priority level which is lower than the priority level of the time slot assignment request; and a queue processor for accumulating time slot assignment requests waiting for assignment for every priority level, wherein said slot assignment controller increases the number of time slots having a priority level of which the number of accumulated time slot assignment requests waiting for assignment exceeds a predetermined number in said queue processor, while decreasing the number of time slot having the other priorities in compensation for the increase, and wherein on the basis of the priority level of the time slot assignment request, said slot assignment controller assigns to a new time slot assignment request having a priority level lower than the priority level of the new time slot assignment request when any past time slot assignment request having the priority level of the new time slot assignment request is not accumulated in said queue processor and there is not any vacant time slot having the priority level of the new time slot assignment request while there is a vacant time slot whose priority level is lower than the priority level of the new time slot assignment request.

9. A communication control apparatus in which plural slave stations transmit data to a master station through a transmission channel of a time division multiple access system, said master station transmits data to said slave stations in a broadcast mode, said master station assigns a time slot to a time slot assignment request transmitted from each of said slave stations to said master station, and each of said slave stations performs the communication by using the time slot assigned thereto, wherein said master station comprises:

a judgment unit for judging a priority level extracted from a time slot assignment request whose priority level is set in accordance with an emergency level of a communication and which is transmitted from each of said slave stations; and a slot assignment controller for securing time slots for each priority level, and assigning to the time slot assignment request a time slot having the same priority level as the priority level of the time slot assignment request when there is at least a time slot having the same priority level as the priority level of the time slot assignment request, and alternatively assigning to the time slot assignment request a time slot having a priority level which is lower than the priority level of the time slot assignment request when there is not any time slot having the same priority level as the priority level of the time slot assignment request and there is at least a time slot having a priority level which is lower than the priority level of the time slot assignment request;

wherein said master station further comprises a statistical processor for counting time slot assignment requests within a predetermined time for every priority level which is set in the time slot assignment request transmitted from each of said slave stations to said master station, and said slot assignment controller changes the number of time slots for each priority level on the basis of the number of time slot assignment requests of each priority level which is counted in said statistical processor.

10. The communication control apparatus as set forth in claim 9, which further comprises a queue processor for accumulating time slot assignment requests waiting for assignment for every priority level, wherein said slot assignment controller increases the number of time slots having a priority level of which the number of accumulated time slot assignment requests waiting for assignment exceeds a predetermined number in said, queue processor, and decreases the number of time slots having the other priorities in compensation for the increase, and wherein on the basis of the judged priority level, said slot assignment controller assigns to a new time slot assignment request a time slot having a priority level lower than the priority level of the new time slot assignment request when any past time slot assignment request having the priority level of the new time slot assignment request is not accumulated in said queue processor and there is not any vacant time slot having the priority level of the new time slot assignment request while there is a vacant time slot whose priority level is lower than the priority level of the new time slot assignment request.

* * * * *